US009525679B2

United States Patent
Mani et al.

(10) Patent No.: US 9,525,679 B2
(45) Date of Patent: Dec. 20, 2016

(54) SENDING SESSION TOKENS THROUGH PASSIVE CLIENTS

(71) Applicant: Microsoft Technology Licensing, LLC, Redmond, WA (US)

(72) Inventors: Seshadri Mani, Redmond, WA (US); William Taylor, Redmond, WA (US); Haytham Abuel-Futuh, Redmond, WA (US); Titus Miron, Seattle, WA (US); Murli Satagopan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/001,134

(22) Filed: Jan. 19, 2016

(65) Prior Publication Data

US 2016/0134617 A1    May 12, 2016

Related U.S. Application Data (62) Division of application No. 14/016,237, filed on Sep. 3, 2013, now Pat. No. 9,276,928.

(60) Provisional application No. 61/835,538, filed on Jun. 15, 2013.

(51) Int. Cl.
  *H04L 29/06* (2006.01)
  *H04L 9/32* (2006.01)

(52) U.S. Cl.
  CPC .......... *H04L 63/0807* (2013.01); *H04L 9/3213* (2013.01); *H04L 63/0815* (2013.01)

(58) Field of Classification Search
  CPC .......... H04L 63/08; H04L 9/32; H04L 9/3213; H04L 63/0815; H04L 63/0884; H04L 63/0807
  USPC .......................................................... 726/10
  See application file for complete search history.

(56) References Cited

U.S. PATENT DOCUMENTS

| | | | |
|---|---|---|---|
| 2004/0230831 A1* | 11/2004 | Spelman | G06F 21/33 726/8 |
| 2005/0114701 A1 | 5/2005 | Atkins et al. | |
| 2005/0278547 A1 | 12/2005 | Hyndman et al. | |
| 2006/0123234 A1 | 6/2006 | Schmidt et al. | |
| 2006/0206932 A1 | 9/2006 | Chong | |

(Continued)

OTHER PUBLICATIONS

"WS-Trust 1.4 OASIS Standard Incorporating Approved Errata 01", Apr. 25, 2012.*

(Continued)

*Primary Examiner* — Yogesh Paliwal
(74) *Attorney, Agent, or Firm* — Julie Kane Akhter; Tom Wong; Micky Minhas (57) ABSTRACT

A session token can be requested to be sent to a first computing service from a second computing service, and a first computing service can receive the requested session token from the second computing service. The first computing service can send a message that includes the session token through a passive client to the second computing service. The second computing service can receive the message that includes the session token from the passive client, and the second computing service can verify that the message is valid. This verification of the validity of the message can include verifying that the session token received back from the passive client matches the session token the second computing service sent to the first computing service.

20 Claims, 8 Drawing Sheets

(56) References Cited

U.S. PATENT DOCUMENTS

2008/0256616 A1* 10/2008 Guarraci ............... H04L 63/08
    726/9
2013/0145427 A1    6/2013 Howard et al.

OTHER PUBLICATIONS

"Notice of Allowance Issued in U.S. Appl. No. 14/016,237", Mailed Date: Oct. 23, 2015, 12 Pages.
"International Preliminary Report on Patentability Issued in PCT Application No. PCT/US2014/042024", Mailed Date: Dec. 23, 2015, 7 Pages.
"International Search Report and Written Opinion Issued in PCT Application No. PCT/US2014/042024", Mailed Date: Sep. 8, 2014, 10 Pages.
Pierson, Nick, "Overview of Active Directory Federation Services in Windows Server 2003 R2", Retrieved from <<http://web.archive.org/web/*/http://download.microsoft.com/download/d/8/2/d827e89e-760a-40e5-a69a-4e75723998c5/ADFS_Overview.doc>>, Oct. 2005, 21 Pages.
Shargavan, et al., "Secure Sessions for Web Services", Retrieved from <<http://doc.utwente.nl/48701/1/secure-sessions-with-scripts.pdf>>, Aug. 23, 2004, 53 Pages.
Bustamante, Michele L., "Build a Security Token Services (STS) with the Geneva Framework", Retrieved from <<https://web.archive.org/web/20120421192409/http://msdn.microsoft.com/en-us/magazine/dd347547.aspx>>, Apr. 21, 2012, 12 Pages.
Fongen, Anders, "Identity Management and Integrity Protection in the Internet of Things", In proceedings of the Third International Conference on Emerging Security Technologies, Sep. 5, 2012, 4 Pages.
Grob, et al., "Proving a WS-Federation Passive Requestor Profile with a Browser Model", In Proceedings of the Workshop on Secure Web Services, Nov. 11, 2005, 11 Pages.
Halpin, Harry, "Web Authentication: The Next Step in the Evolving Identity Eco-System?", In Proceedings of the IEEE CS Security and Privacy Workshops, May 24, 2012, 4 Pages.
Hardt, D., "The OAuth 2.0 Authorization Framework", Retrieved from <<https://tools.ietf.org/html/rfc6749>>, Oct. 2012, 76 Pages.
Hawk, Soaring, "Email Policy Service Trust Processing", Retrieved from <<http://tools.ietf.org/pdf/draft-schaad-eps-trust-00.pdf>>, Jan. 21, 2001, 22 Pages.
Jones, et al., "The OAuth 2.0 Authorization Framework: Bearer Token Usage", Retrieved from <<https://tools.ietf.org/html/rfc6750>>, Oct. 2012, 18 Pages.
Mont, et al., "On Identity-Aware Devices: Pulling Users in Control Across Federated Services", Retrieved from <<http://citeseerx.ist.psu.edu/viewdoc/download?doi=10.1.1.408.8417&rep=rep1&type=pdf>>, Mar. 26, 2008, 11 Pages.
"[MS-SPS2SAUTH]: OAuth 2.0 Authentication Protocol: Sharepoint Profile", Retrieved from <<file:///C/Users/jshersia1/Downloads/[MS-SPS2SAUTH]%20(1).pdf>>, Feb. 11, 2013, 21 Pages.
"WS-Trust 1.4: OASIS Standard Incorporating Approved Errata 01", Retrieved from <<http://docs.oasis-open.org/ws-sx/ws-trust/v1.4/ws-trust.html>>, Apr. 25, 2012, 85 Pages.

* cited by examiner

SENDING SESSION TOKENS THROUGH PASSIVE CLIENTS

RELATED APPLICATIONS

The present application is a divisional of U.S. patent application Ser. No. 14/016,237, filed Sep. 3, 2013, which claims priority to U.S. Provisional Application No. 61/835,538, filed Jun. 15, 2013, both of which are incorporated herein by reference. If any disclosures are incorporated herein by reference and such incorporated disclosures conflict in part or whole with the present disclosure, then to the extent of conflict, and/or broader disclosure, and/or broader definition of terms, the present disclosure controls.

BACKGROUND

Online computing services often communicate with clients, such as remote clients, over computer networks. As used herein, a computing service is a computing component (such as a computer application) that runs on a host that includes one or more computing machines and that performs actions for one or more local and/or remote clients. In some instances, a first computing service sends a redirect message to a client, instructing the client to redirect to another computing service. Such a redirect message may include information that the client is to send on to the second computing service.

Sometimes such a redirect message is used to instruct the passive client to communicate with a second computing service that requires authentication. In such a situation, user input has been required to sign into the second computing service, even if user input was already provided to sign into a first computing service that sent the redirect message.

SUMMARY

The tools and techniques discussed herein relate to sending a session token from a first computing service to a second computing service from which the first computing service obtained the session token. A session token is a token that includes sufficient information for a sender (such as the second computing service) of the session token to verify that the token matches and has not been tampered with when the token is returned to that sender. The session token can be sent through a passive client, such as a passive client with which the first computing service is communicating prior to the session token being sent and with which the second computing service is communicating after the session token is sent. As used herein, a passive client is a general computer client that lacks an ability to make its own reasoned decisions about which specific computing entity or entities the client is to send the session token to. Instead, a passive client blindly forwards the session token where the passive client is specifically instructed to do so, such as where the passive client is instructed by the first computing service to forward the session token to the second computing service (e.g., where the second computing service is identified in a redirect message from the first computing service). For example, the passive client may be a passive client running on a mobile device (e.g., a smartphone), a tablet device, or a desktop device (e.g., a laptop computer or a desktop computer), such as a mobile application, a mobile browser client, a tablet browser client, a tablet application, a desktop application, and/or a desktop browser client.

In one embodiment, the tools and techniques can include requesting a session token to be sent to a first computing service from a second computing service, and a first computing service receiving the requested session token from the second computing service. The first computing service can send a message that includes the session token through a passive client to the second computing service.

In another embodiment of the tools and techniques, a first session token can be sent from a second computing service to a first computing service. The second computing service can receive a message comprising a second session token that is purported to match the first session token from a passive client. The second computing service can verify that the message is valid, which can include verifying that the second session token matches the first session token. As used herein, a session tokens matching refers to the session tokens corresponding to each other so that the second token has not been modified in an unexpected manner. For example, in some techniques, two session tokens match if they are the same as each other.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for communications between computing services. Such improvements may result from the use of various techniques and tools separately or in combination.

Such techniques and tools may include a first service returning a session token to a second service from which the token was received by the first service. The session token can be a secret that the second service keeps from the first service and from a passive client through which the token is returned to the second service. For example, the session token may be encrypted so that the session token is opaque to the first service and to the passive client, but can be decrypted and processed by the second service. The session token can be returned through a passive client. Such tools and techniques may be used to allow the first computing service to securely send information to the second computing service, even if the passive client is not trusted. For example, the information to be sent can be included in the session token. As an example, the session token may be a proof token, which may be sent to the first computing service along with a proof key. As used herein, a proof token is a token that is provided along with a proof key, which can be used to sign additional information. The proof token, the proof key, and the information signed with the proof key provide an indication that the signed information came from the first computing service to whom the second computing service provided the proof token and proof key. Accordingly, the first computing service can sign additional information with the proof key. The first computing service can send the signed additional information with the proof key to the second computing service through the passive client. This can allow the second computing service to receive the additional information from the passive client in a manner where the passive client initiates the communication with the second computing service. The browser and the second computing service may thereafter continue communicating in a client-server configuration—such as a Web browser and Web service configuration over a computer network such as a global computer network.

In one example of an implementation of the tools and techniques discussed herein, two trusted services can securely delegate identities (such as user and/or application identities) through passive clients (e.g., Web browsers without add-ins or other code specifically directed to handling the identity delegation scenario) over a computer network such as the Internet.

Accordingly, one or more substantial benefits can be realized from the tools and techniques described herein. For example, the tools and techniques herein can allow two services to securely communicate through a passive client, even if that client and a network through which such communications are passed is insecure or not trusted. As an example, such a communication may include information to delegate identity from one service to the other. This can provide efficiencies, such as avoiding the need for user input to authenticate at the second computing service when authenticating user input has already been provided on the first computing service by a matching identity (such as in association with a first profile for the first computing service that matches a second profile for the second computing service). Additionally, with the proof token example discussed above, the proof token and proof key may be sent once from the second service to the first service, and the proof token and key may be used multiple times to send multiple secure messages from the first computing service to the second computing service through one or more passive clients. This can provide additional efficiencies by avoiding sending a new token from the second computing service to the first computing service for each new message to be sent through the passive client from the first computing service to the second computing service.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein. For example, the computing services, identity provider, and client discussed herein may be implemented as hardware logic and/or as software running on hardware components, such as the types of components discussed below.

I. Exemplary Computing Environment

Figure 1:
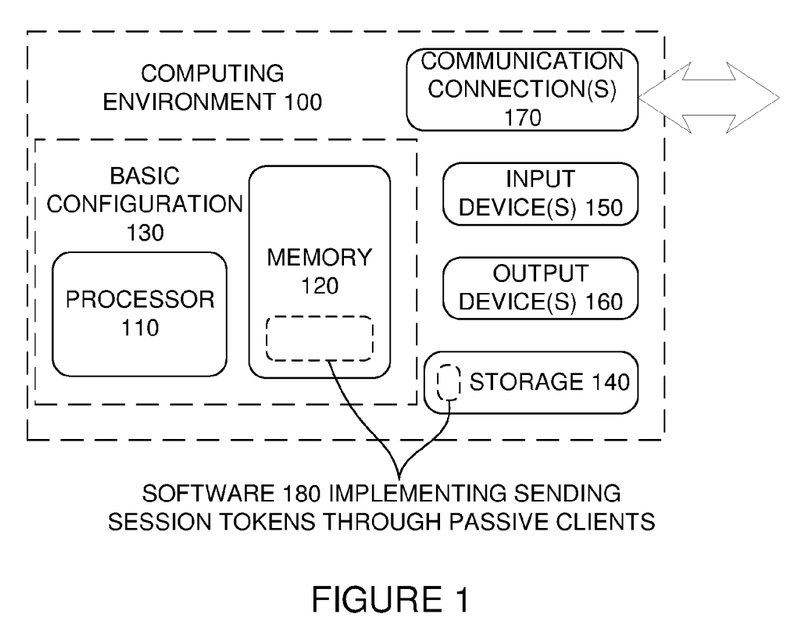
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as the first computing service and/or the second computing service, identity provider, and/or as a computing machine hosting a passive client. Generally, various different general purpose or special purpose computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, various illustrated hardware-based computer components will be discussed. As will be discussed, these hardware components may store and/or execute software. The computing environment (100)

includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing sending session tokens through passive clients. An implementation of sending session tokens through passive clients may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as flash drives, magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "send," "receive," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Session Token Sending System and Environment

Figure 2:
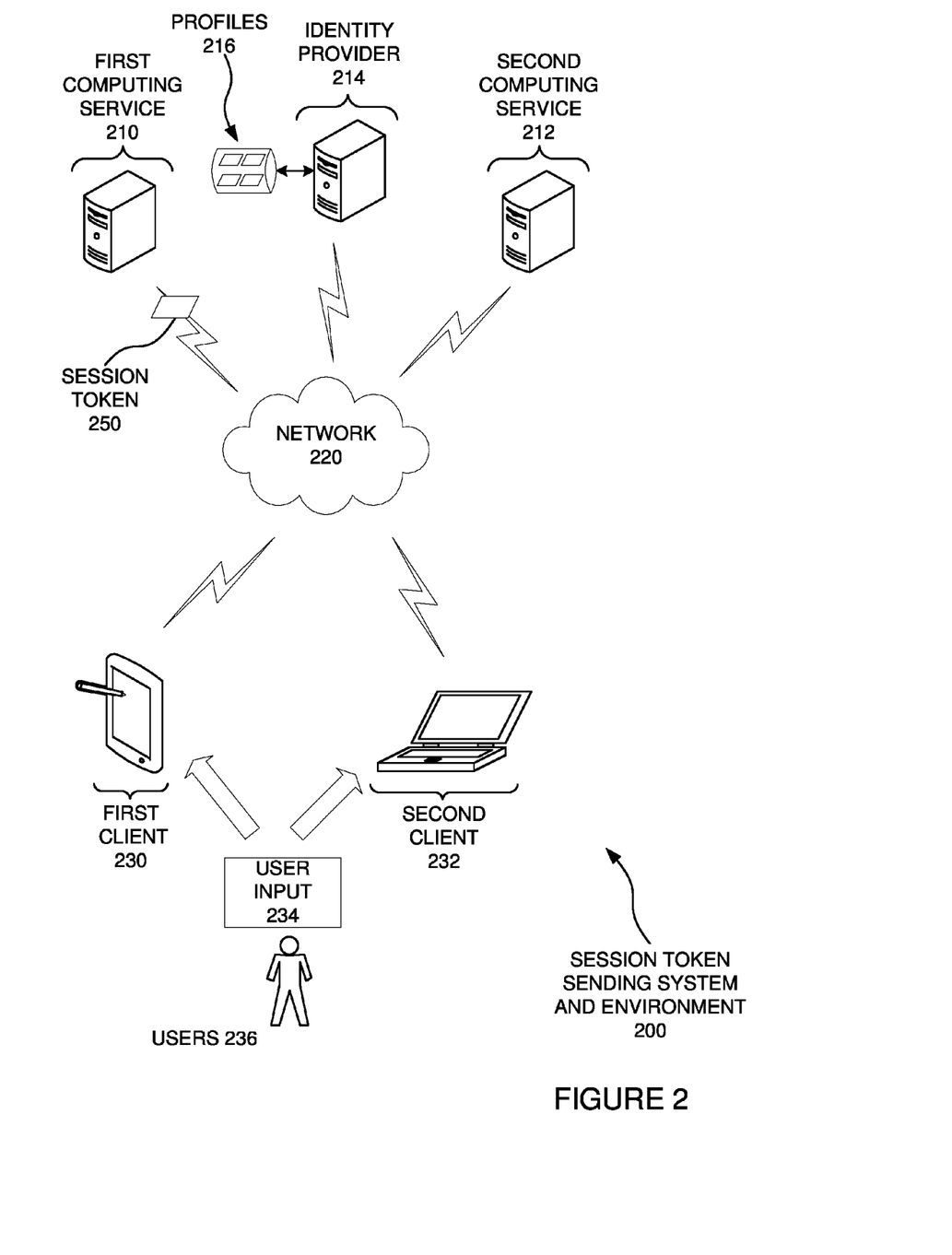
FIG. 2 is a schematic diagram of an environment for sending session tokens across services through passive clients.

FIG. 2 is a schematic diagram of an environment (200) in conjunction with which one or more of the described embodiments may be implemented. The environment (200) can include a first computing service (210), and a second computing service (212) that is different from the first computing service (210). The computing services (210 and 212) can provide services over computer connections, such as to local clients (e.g., where one or both services (210 and 212) is on the same machine as a service) or to remote clients. For example, the computing services (210 and 212) can be Web-based services that communicate with passive clients over a global computer network such as the Internet. Such Web-based services could include email services, calendar services, social networking services, financial payment and/or account management services, word processing services, spreadsheet services, data storage and/or sharing services, etc. Thus, each of the messages discussed herein that are sent between different computing services and/or between one or more computing services and a passive client may be send over a global computer network such as the Internet. The first and second computing services (210 and 212) can have separate authentication mechanisms. Identifications for the services (210 and 212) may be managed by a single identity provider (214), as illustrated in FIG. 2, or by multiple identity providers, such as a single identity provider for each service (210 and 212). The identity provider (214) can manage profiles (216), which are units of data representing entities such as one or more users or one or more applications that can access one or more computing services whose identities (i.e., identities of corresponding profiles (216) that can be used to authorize use of the corresponding services) are managed by the identity provider (214). The computing services (210 and 212) and the identity provider (214) may be hosted on one or more machines that are remote from each other, or they may be located locally with respect to each other. For example, the first computing service (210) and the second computing service (212) may be hosted on different machines in the same data center, hosted on machines in different data centers, or even hosted on the same machine. Each computing service (210 and 212) may be hosted on one machine or multiple machines.

The first computing service (210), the second computing service (212), and the identity provider (214) can be connected to communicate with each other and/or other computing entities through one or more connections such as a computer network (220). The computing services (210 and 212) and the identity provider (214) may also be connected to communicate with one or more clients, such as a first client (230) and a second client (232). The profiles (216) can represent an identity that is associated with one or more of the clients (230 and/or 232), where the identity can be the identity of one or more users, applications, hosts, or devices. The first client (230) and the second client (232) can be running on different client devices or on the same client device. The client devices can receive user input (234) from one or more users (236) and can pass the user input (234) to the corresponding client (230 or 232). For example, such user input (234) may be initiated by the user(s) (236) in the form of touch input, mouse clicks, keyboard input, non-contact gestures (hand motions, etc.), or some other type of user input.

In an example illustrated in FIG. 2, the first client (230), the second client (232), the first computing service (210), the second computing service (212), and the identity provider (214) may all be connected to communicate through a single network (220), such as the Internet. One or more of the clients (230 and 232), computing services (210 and 212), and identity provider (214) may be connected to one or more other networks in addition to or instead of the common network (220). For example, the first computing service (210), the second computing service (212), and the identity provider (214) may all be connected to communicate with each other through a private network (e.g., a secure private network) that does not utilize the common network (220) through which the computing services (210 and 212) and the identity provider (214) communicate with the clients (230 and 232). The network (220) can include network hardware, such as addition computing machines, routers, switches, wired communication lines, wireless communications devices, etc.

Accordingly, data such as session tokens (250) can be passed between the different computing components (210, 214, 212, 230, and 232) and can be processed by those computing components (210, 214, 212, 230, and 232) in various ways, such as the examples discussed below.

III. Example Approaches and Uses of Sending Session Tokens Through Passive Clients Some examples of approaches to, and uses of, sending session tokens through passive clients will now be discussed. Other alternative approaches and uses could also be performed within the scope of the tools and techniques discussed herein.

A. Proof Token Approach for Delegating User Identity Between Services Through a Passive Client The example approach discussed in this section can be used for two services to notify a user identity over a browser client in a secure manner. The approach will be discussed with reference to the example call flow illustrated in FIG. 3, which illustrates communications between a client (302), a first computing service (304), a second computing service (306), and an identity provider (308). As an example, joe@contoso.com may be the name of a profile that is subscribed to the first computing service (304) and can be authorized to use the first computing service, and also the name of a profile that is subscribed to the second computing service (306) and can be authorized to use the second computing service (306). For example, the first computing service (304) may be an email and calendaring Web service, and the second computing service (306) may be a file storage and sharing Web service. The identity provider (308) can be an identity provider that manages the identities of profiles that have permissions to be authorized to use the computing services (304 and 306). Alternatively, each separate computing service (304 and 306) could act as its own identity provider and/or use different identity providers. The client (302) can be a passive client that can communicate with the computing services (304 and 306) and the identity provider (308). For example, the client (302) may be a standard Web browser running on a client computing device, such as a personal computer, a laptop computer, a tablet computer, or a smartphone.

Figure 3:
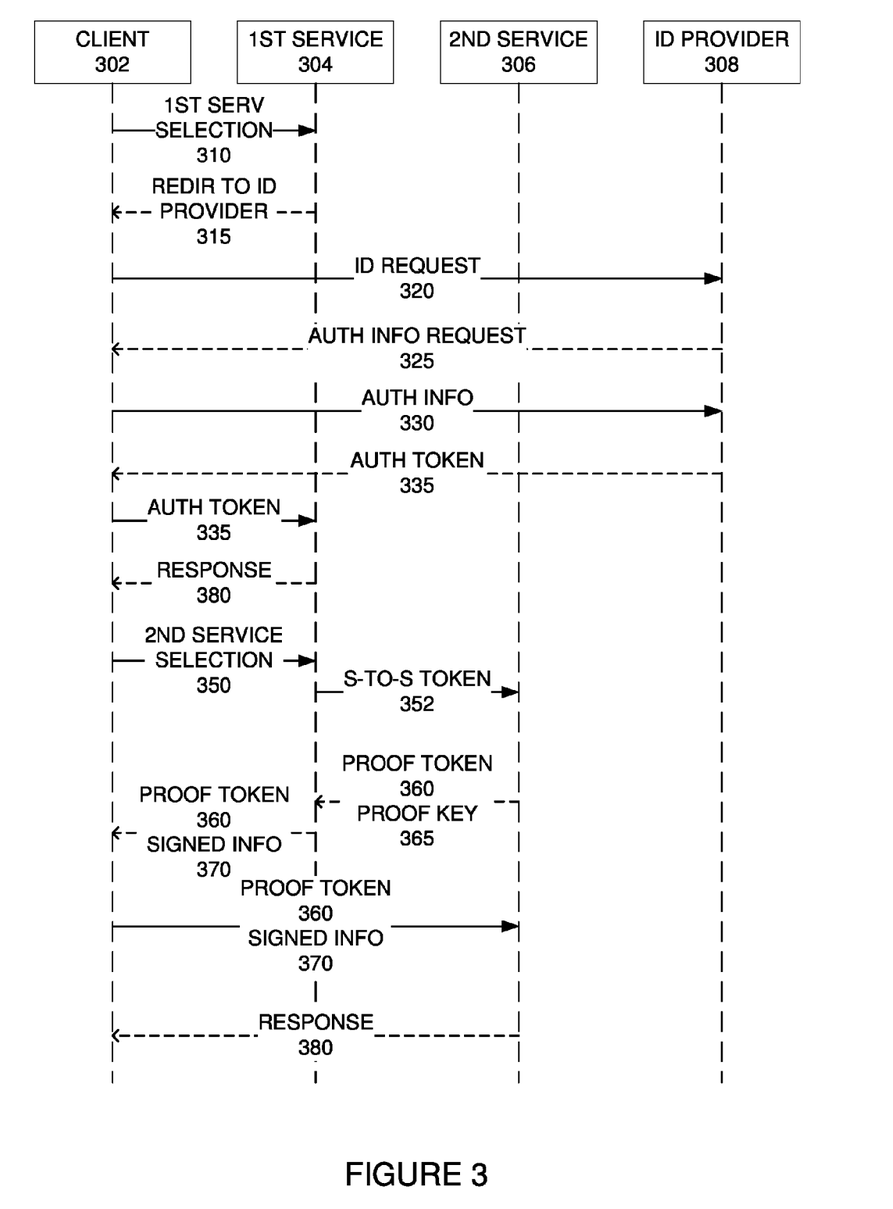
FIG. 3 is a call flow diagram depicting a call flow for an example proof token approach for delegating user identity between services through a passive client.

In the example of FIG. 3, the communications between the computing components (302, 304, 306, and 308) can be communications sent over a computer network. For example, the communications may be formatted as HTTP messages sent over TCP/IP through one or more computer networks, such as the Internet. In other examples, communications could be formatted differently, such as application programming interface calls within a computing machine (e.g., where the different computing services (302 and 304) reside on the same computing machine), or messages formatted according to some other communications protocol.

Referring still to FIG. 3, the client (302) can receive user input (not shown) selecting the first computing service (304). The client (302) can respond to such user input by sending to the first computing service (304) a selection (310) of that first computing service (304). The first computing service (304) can respond with a redirect message (315), which can instruct the client (302) to send an identification request (320) to the identity provider (308).

In response to receiving the identification request (320) from the client (302), the identity provider (308) can respond with an authentication information request (325). For example, the authentication information request (325) can include a sign-on page that the client (302) can display to receive user input with the authentication information (e.g., a username and password). As instructed by the authentication information request (325) and in response to such user input, the client (302) can send the authentication information (330) to the identity provider (308). The identity provider (308) can verify that the authentication information matches stored authentication information for a profile that has a subscription to use the first service (304). If so, then the identity provider (308) can respond to the client (302) with an authentication token (335) and a redirect message instructing the client (302) to forward the authentication token to the first service (304).

The client (302) can respond by sending the authentication token (335) to the first service (304). The first service (304) can respond by verifying that the authentication token (335) is valid, and if so, then providing a response (380), which can reveal that the associated profile is authorized to use the first service (304). For example, in the response (380), the first service (304) can provide a Web page listing features provided by the first service (304). The profile may be signed onto a realm that is defined by the subscription that an associated tenant has to the first service (304). For example, if the profile's name were joe@contoso.com, the realm may be a realm associated with "contoso.com", and there may be one or more subscriptions associated with the contoso.com realm. This may allow the profile to use features provided by the first service (304) that are associated with that realm (e.g., access to files provided by other user profiles of the contoso.com realm). While the profile is signed into the first service (304), the first service (304) and/or the identity provider (308) can maintain an identifier associated with the profile, such as a "personal unique identifier" (PUID).

Figure 4:
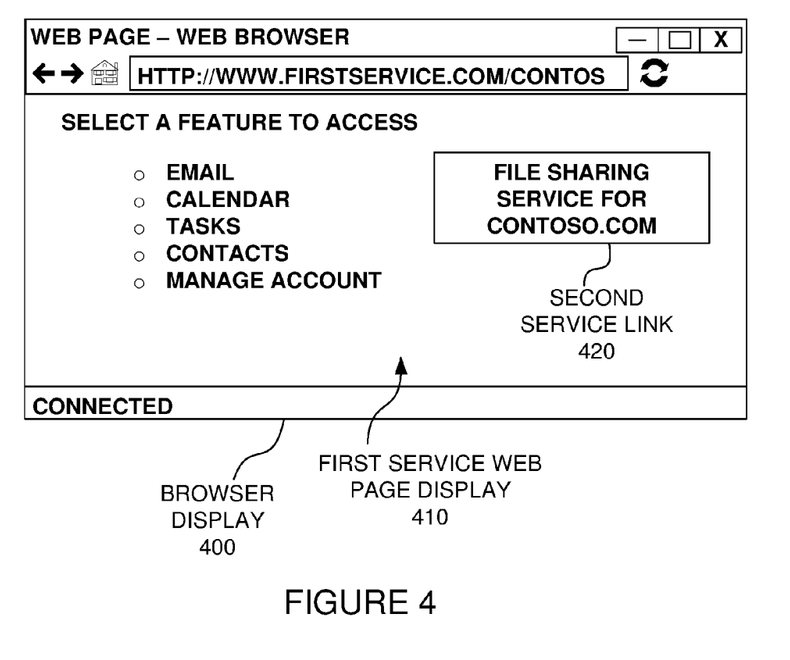
FIG. 4 is an illustration of a browser display example that could be used with the approach of FIG. 3.

While the user profile is using the first service (304), user input may be provided at the client (302) to select the second service (306). For example, the user input may be provided by selecting a link within a Web page provided by the first service (304). Referring to FIGS. 3-4, an example of a browser display (400) is illustrated in FIG. 4, such as where the passive client (302) is a Web browser. The browser display (400) features an example of a Web page display (410) of a page (e.g., an HTML page or a page in some other format) received from the first service (304), such as in the response (380) of FIG. 3. The example Web page display (410) includes a list of features provided by the first service (304), which may be selected to invoke those features. For the illustrated example, these features include an email feature, a calendar feature, a tasks feature, a contacts feature, and an account management feature. Additionally, the Web page display (410) includes a link (420) for selecting the second service (306), which is a file sharing service in the illustrated example. User input can be provided to select the second service link (420), such as by touching the link on a touch screen.

Referring to FIG. 3, in response to the second service (306) being selected by user input, the client (302) can send a second service selection (350) to the first service (304), according to instructions included in a response from the first service (304) (e.g., in a Web page). In response to the second service selection (350), the first service (304) can make a service-to-service call to the second service (306). This service-to-service call can include a service-to-service token (352), and can request a proof token. The service-to-service token (352) may have been obtained by the first service (304) from another source, such as from the identity provider (308). In response to receiving the service-to-service token (352) from the first service (304), the second service (306) can verify the service-to-service token (352) to verify that the message comes from the first service (304). The service-to-service token (352) may only be sent from the first service (304) to the second service (306) once during a lifecycle of a pool of services that includes the first service (304) and the second service (306), even if the first service (304) makes multiple service-to-service calls to the second service (306). As an example, the service-to-service call may be made to an API of the second service (306) for requesting proof tokens (e.g., an API entitled "GetProofToken( )").

The second service (306) can respond to the service-to-service call by generating and sending a proof token (360) and a proof key (365) to the first service (304). For example, the response can include a Java Script Object Notation (JSON) object that can contain the proof token (360) and the proof key (365), such as in the following format: (1) proof_token: The proof token (360), which can be opaque to first service (304), such as an encrypted value; (2) exp: The expiry of the proof token; and (3) the proof key (365), which may be a plain text, base64 encoded key. The proof key (365) can be a symmetric key that is encrypted by the second service (306) prior to being sent, using any of various different encryption schemes that will allow the first service (304) to decrypt the proof key (365). Alternatively, an asymmetric key pair could be used, with the proof key (365) being the public key, which can be sent without encryption. The object that includes the proof token (360) and the proof key (365) can be signed by the second service (306). For example, the second service (306) may sign the object using a 256 bit RSA key, or some other signature scheme.

Upon receiving the proof token (360) and the proof key (365), the first service (304) can assure that the signature of the object including the proof token (360) and the proof key (365) is valid, and can decrypt the proof key (365). The first service can include additional information with the proof token (360), and can sign the additional information with the proof key (365) to produce signed information (370). For example, the first service may generate a user identity token to be included as the additional signed information (370).

In an example, the user identity token may include the following characteristics: (1) Token format: JWT (JSON Web Token); (2) Signature: SHA-256, which can be the type of signature used with the proof key to sign the identity token; and (3) Claims. The following table lists some claims that may be included in an example of the user identity token:

| Claim | Usage | Sample value |
|---|---|---|
| aud | The audience of the token | 0003/contoso-appweb1.firstservice.com@ 123-456-677 |
| upn | The user principal name of the user | joe@contoso.com |
| nameid | The PUID of the user | 1234567890 |
| nii | NameId issuer | urn:servicegroup:federation |
| nbf | Not before: when the token starts to be valid | |
| exp | Expiry of the token | |
| smtp | SMTP primary email of the user | joe@contoso.com |
| sip | SIP address for the user | |
| iss | Issuer of the token | |

-continued

| Claim | Usage | Sample value |
|---|---|---|
| isuser | Identifies whether the subject profile is a user profile, as compared to an application profile, etc. | |

One or more of nameid, upn, smtp, or sip claims can be used to identify the profile that is the subject of the token. If a profile is signed on to the first service (304) as an anonymous user, then the nameid claim can be a general value that indicates this fact, such as a particular symbol (e.g., the "@" symbol).

The first service (304) can send a message including the signed additional information (370) (e.g., a user identity token) and the proof token (360) to the client (302), with an instruction to forward the message to the second service (306) (e.g., as a redirect message). The body of this message can include a field for the user identity token, and a field for the proof token.

Following is an example of contents of a proof token and an identity token, although any of various different formats for such contents could be used, where the fields are as discussed above, and the "alg" field is a signature algorithm identification field, the "x5t" field includes the proof key, and the "prf" field includes the proof token:

- Proof Token contents
  {
    "typ":JWT
    "alg":RS256
    "x5t":CC-CF-D8-41-0F-A0-17-DD-91-EC-AA-AB-CB-95-4F-DE-94-E1-4C-ED
  }
  {
    "aud":0002/*.firstservice.com@*
    "iss":0003@1234-2232
    "nbf": 1366053429
    "exp":2013-04-16 19:17:09Z (4/16/2013 12:17:09 PM) - 1366139829
    "prf":wd4eXqy5qtxH9TzwG4dDnt5EvTTsn+v25EzeZcN7sV3dTc/rldNYInv9CFgi+IQ
    g3LnXTlxc5xz1c/cKswzt4+dKU3wGSK8jnUTKAF/rStNs75wo+VreX/pLpUtZ9KYY
    KpkdfOo01Deofz23LGoe4eMTe7DeQ88dcZWWi+fpYz6yAbtRXJCMfCqck5ypj9TcJ
    G7AZEGADr4tc5ZF8Nu+b/xqKMG9aZb7LyGlpPZqKfSPfCuRfcmHlV2SbmESPMfI
    YRtrUgK27fBVZS4szJEXBKnFz4ccNnqct8L5ITy14ir03vMh3NdEfB8vuwZpN6QIwr
    kDj21hkafXsAR1KObSvw==
  }
- Identity Token contents
  {
    "typ":JWT
    "alg":HS256
  }
  {
    "aud":0002/secondservice.com@1234-2232
    "iss":0003@1234-2232
    "nbf":2013-04-15 19:17:09Z (4/15/2013 12:17:09 PM) - 1366053429
    "exp":2013-04-16 19:17:09Z (4/16/2013 12:17:09 PM) - 1366139829
    "upn":"foo@contoso.com"
    "nameid":1234567890
    "nii":urn:servicegroup:federation
    "smtp":"fooSMTP@contoso.com"
    "sip":"cfooSip@contoso.com"
    "isuser":true
  }

As instructed, the client (302) can forward the message with the proof token (360) and the signed additional information (370) to the second service (306). In response, the second service (306) can parse and validate the information received in the message. For example, the second service (306) may perform the following: (1) Validate the signature of the proof token; (2) Decrypt the proof token; (3) Validate the expiry of the proof token; (4) Extract the symmetric key from the proof token; (5) Use that symmetric key to validate the signature on the user identity token; (6) Validate the expiry of the user identity token; and (7) Validate the audience ("aud") claim, such as where the format is <app-id>/<hostname>@<realm> and the expected values are: <app-id>==the second service's principal id; <hostname>==Hostname of the URL where this token is posted to; and <realm>==Current first service tenant's ID (if it is present, this can be validated).

The second service (306) can use the information in the identity token to perform mapping to the second service's corresponding profile so that the second service's profile can be authorized to use the second service (306). For example, the second service (306) may perform the following:

If nameid exists check the nii value, if the nii value matches urn:servicegroup:federation value (a value indicating a federated group of services) then the value in nameid is PUID of the user. Try mapping the nameid against the second service's database of user profiles.

If no such mapping is found, then get the smtp claim from the token if exists. Try mapping the smtp claim against the second service's database of user profiles.

If the smtp claim is not found and if the upn exists, then do a call to the identity provider (308) to get the profile's email aliases. If none of them maps to the second service's database of user profiles, then prompt the user through the client (302).

Whenever a map to an existing profile is found in the second service (306), then add the PUID of the profile to the mapping table of the second service (306), and send a response (380) to the client (302) showing the subject profile is authorized to use the second service (306). For example, the response (380) can include sending a Web page including and/or listing features provided by the second service (306). Such a Web page can be displayed by the client (302).

B. Approach to Securely Sending Information in a Session Token Between Services Through a Passive Client The example approach discussed in this section can be used for securely sending information in session tokens between the two services through a passive client. Referring to the call flow diagram of FIG. 5, this approach involves communications between a client (502), a first service (504), and a second service (506). Unless otherwise noted in this section, the formats of various communications can be the same as in the approach discussed in the previous section, or some other format. In the example, a second service selection (550) can be sent by the client (502) to the first service (504). For example, the client (502) may send the second service selection (550) in response to user input provided by a user of the client (502). Alternatively, this approach may be performed without the first service (504) receiving such a second service selection (550) from the client (502). The first service (504) can send a session token request (555) to the second service. For example, the session token request (555) may identify information that is to be sent from the first service (504) to the second service (506) through the client (502). For example, the session token request may identify a user profile that is authorized to use the first service (504) and whose identity is to be delegated to the second service (506) so that a corresponding user profile (or the same user profile) for the second service can be authorized to use the second service (506) as well.

Figure 5:
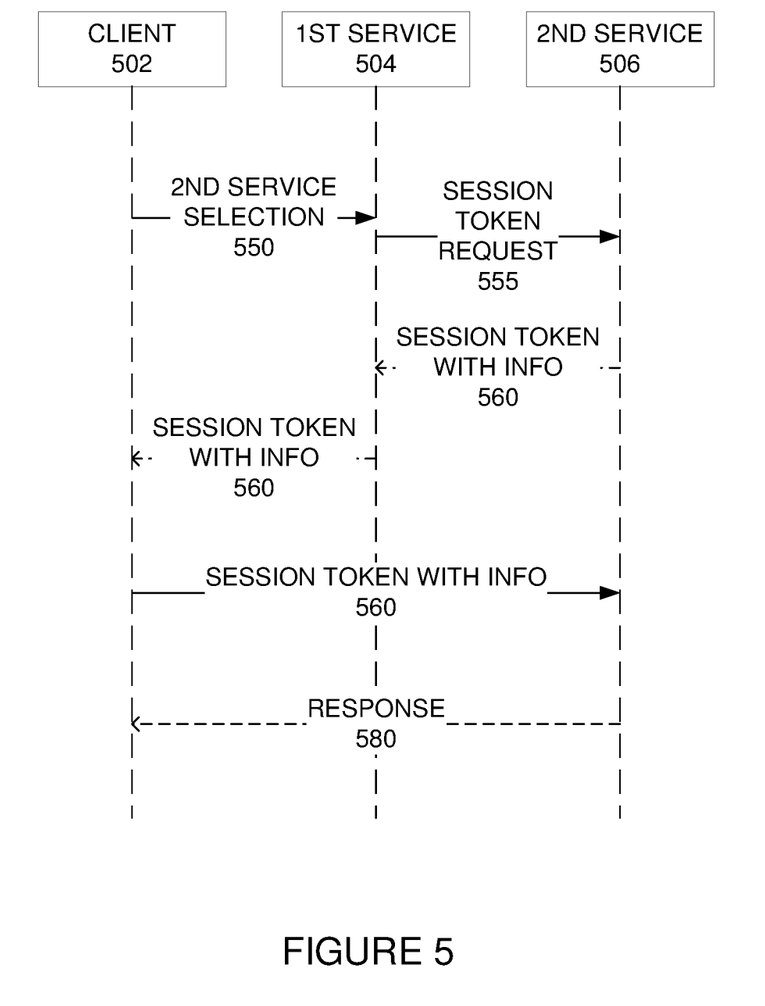
FIG. 5 is a call flow diagram depicting an approach to securely sending information in a session token between services through a passive client.

In response, the second service can include the requested information in a session token (560), and may encrypt the session token (560). The session token (560) with the information can be sent from the second service (506) to the first service (504). The first service (504) can forward the session token (560) to the client (502) with instructions to forward the session token (560) to the second service (506) (e.g., by including the session token with a redirect message). The client (502) can respond to these instructions by forwarding the session token (560) to the second service (506), as instructed. The second service (506) can process the session token (560), and can provide a response (580) to the client (502).

Many different variations of the approaches discussed herein could be used. For example, session tokens may be used to pass information other than identity delegation information between services through a passive client. Also various different encryption schemes, signature schemes, etc. may be used to insure that sent information is not tampered with en route between the services, and/or that such tampering can be detected.

IV. Techniques for Sending Session Tokens Through Passive Clients

Several techniques for sending session tokens through passive clients will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique. The techniques discussed below may be performed at least in part by hardware logic.

Figure 6:
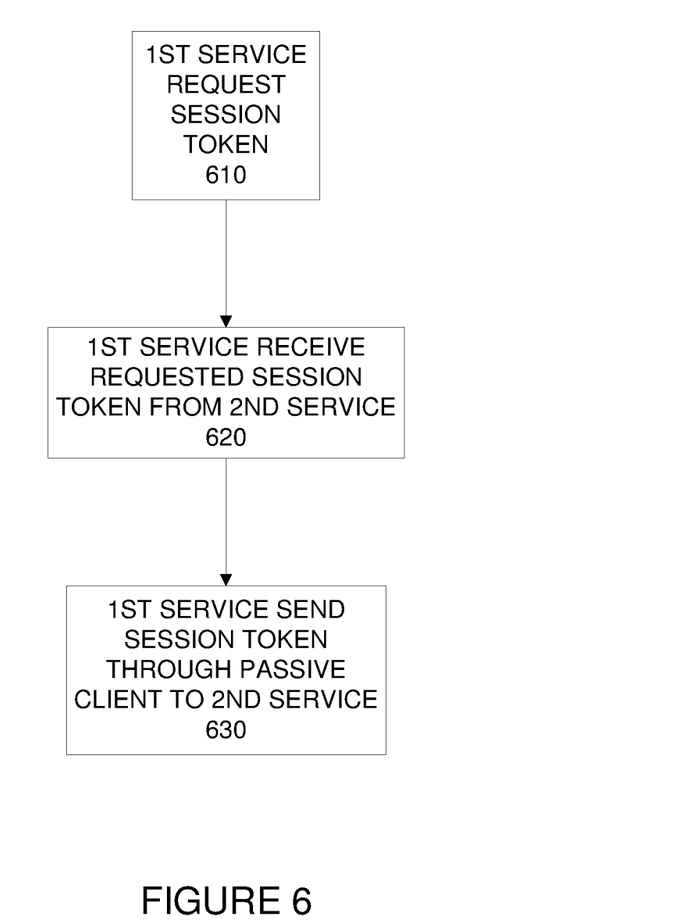
FIG. 6 is a flow diagram illustrating a technique for sending session tokens through passive clients.

Referring to FIG. 6, a technique for sending session tokens through passive clients will be described. The technique can include a first computing service requesting (610) a session token from a second computing service. The first computing service can receive (620) the requested session token from the second computing service. The first computing service can send (630) a message comprising the session token through a passive client to the second computing service.

The session token can be a proof token, and the first computing service can also receive a proof key with the proof token. The technique can further include the first computing service signing a set of additional data with the proof key and including the set of additional data in the message comprising the proof token. The set of additional data can be termed a first set of additional data and the message including the proof token can be termed a first message. The technique can further include the first computing service signing a second set of additional data with the proof token. The technique can also include including the second set of additional data in a second message. The second message can include the proof token. The second message can be sent through a passive client (either the same passive client through which the first message was sent or a different passive client from the passive client through which the first message was sent) to the second computing service. The first and/or second set of additional data can include a profile identity token indicating that an identified profile associated with the passive client is authorized to use the first computing service.

The technique of FIG. 6 can further include authorizing a first profile to use the first computing service, as well as the first computing service receiving a request to use the second computing service. The request to use the second computing service can be received from the passive client, and the passive client can be associated with the first profile. The first computing service requesting the session token from the second computing service can be done in response to the first computing service receiving the request to use the second computing service. The first computing service authorizing the first profile to use the first computing service can include the first computing service using an identity providing service that is separate from the first computing service to authenticate the first profile. For example, this authorization can include the first computing service redirecting the passive client to the identity providing service. As another example, this authorization can include the first computing service programmatically calling to the identity providing service.

The passive client can be remote from the first computing service. In one example, the passive client can be a browser client, such as a Web browser client that interacts with the first computing service and the second computing service over a network, such as a global computer network.

Figure 7:
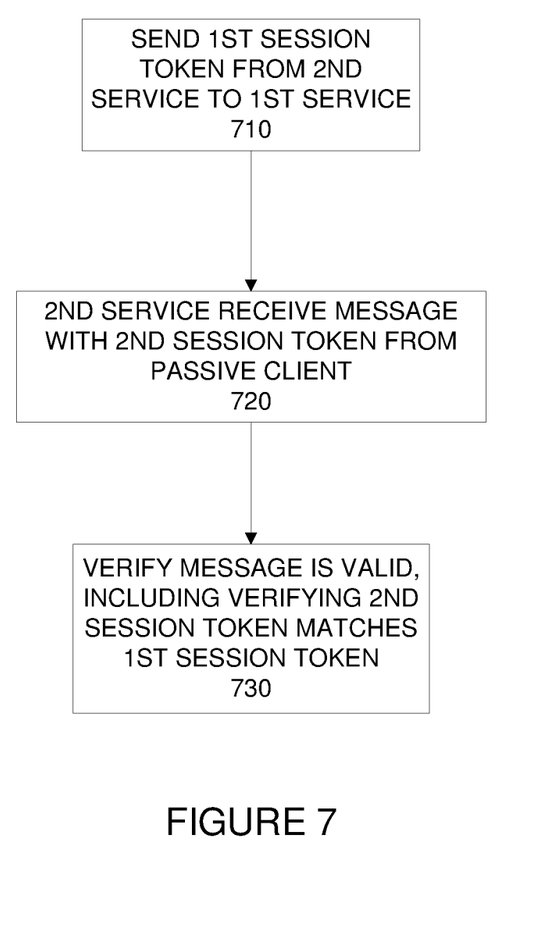
FIG. 7 is a flow diagram illustrating another technique for sending session tokens through passive clients.

Referring to FIG. 7, another technique for sending session tokens through passive clients will be discussed. The technique can include sending (710) a first session token to a first computing service from a second computing service. The second computing service can receive (720) from a passive client a message that includes a second session token that is purported to match the first session token. The second computing service can verify (730) that the message is valid, which can include verifying that the second session token matches the first session token, such as verifying that the second session token is the same as the first session token.

The message can indicate that a profile (such as a user profile or an application profile) is authorized to use the first computing service. The technique of FIG. 7 can further include, in response to the second computing service verifying that the message is valid, the second computing service authorizing an identity corresponding to the profile to use the second computing service (e.g., by authorizing the same profile to use the second computing service and/or authorizing a different corresponding profile to use the second computing service). The validated message can include identity information that the second computing service can use for the second computing service's internal authorization technique. Accordingly, the second computing service can perform a separate internal authorization before granting access to the identified profile. For example, this may include mapping information in the profile to profile information maintained for a subscription to the second computing service, assuring that such a subscription is currently active and valid, etc.

In the technique of FIG. 7, the passive client can be remote from the first computing service and from the second computing service. The passive client may be browser client, such as a Web browser client.

The first session token of FIG. 7 can be a first proof token, the second session token can be a second proof token, and the second computing service can send a proof key with the first proof token. The message of FIG. 7 that includes the second proof token can also include a set of additional data included in the sending of the first proof token from the second computing service to the first computing service. Verifying that the message is valid can include verifying that the set of additional data was signed with the proof key.

The set of additional data may be termed a first set of additional data, and the message that includes the second proof token can be termed a first message. The technique can further include the second computing service receiving a second message that includes a second set of data and a third proof token. The second computing service can verify that the second message is valid, which can include verifying that the third proof token matches the first proof token and that the second set of additional data was signed with the proof key.

The sending of the first session token to the first computing service from the second computing service can include sending the first session token from the second computing service to the first computing service without directing the session token through the passive client.

Figure 8:
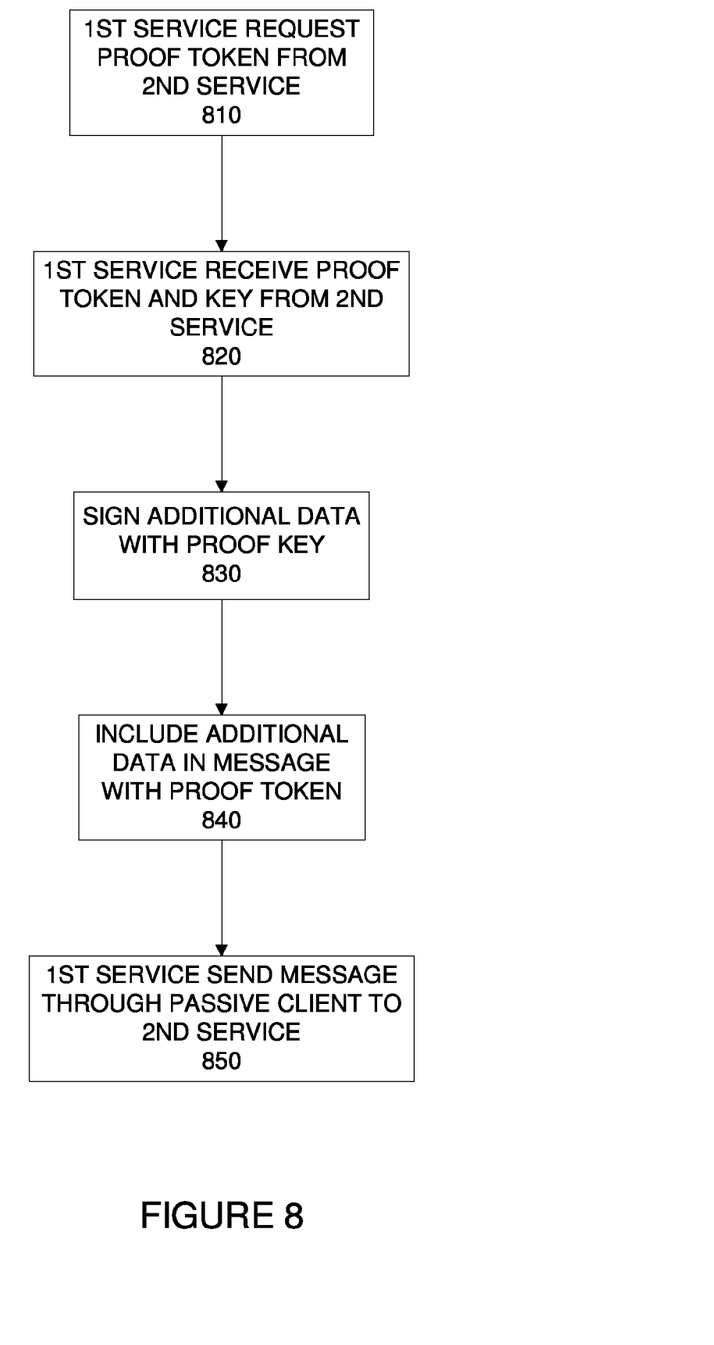
FIG. 8 is a flow diagram illustrating yet another technique for sending session tokens through passive clients.

Referring now to FIG. 8, yet another technique for sending session tokens through passive clients will be discussed. The technique can include a first computing service requesting (810) a proof token from a second computing service. The first computing service can receive (820) the requested proof token and a proof key from the second computing service. The proof token can be opaque to the first computing service. The first computing service can sign (830) a set of additional data with the proof key, with the set of additional data including a profile identity token indicating that an identified profile associated with a passive client is authorized to use the first computing service. The first computing service can include (840) the signed set of additional data in a message. The first computing service can send (850) the message over a computer network and through the passive client to the second computing service. The sending (850) of the message through the passive browser can include the first computing service identifying the second computing service to the passive browser and instructing the passive browser to send the message to the second computing service, such as by sending the passive browser a redirect message identifying the second computing service.

The techniques discussed above can provide various benefits, such as allowing for information, such as identity delegation messages, to be securely and efficiently passed between computing services within a client-server configuration that involves the passive client initiating communications, and services responding to the passive client (e.g., in a typical Web browser configuration).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
   requesting a proof token to be sent to a first computing service from a second computing service;
   the first computing service receiving a proof key with the requested proof token from the second computing service; and
   the first computing service sending a message comprising the proof token through a passive client to the second computing service.

2. The method of claim 1, wherein the method further comprises the first computing service signing a set of additional data with the proof key and including the set of additional data in the message comprising the proof token.

3. The method of claim 2, wherein the set of additional data is a first set of additional data, the message comprising the proof token is a first message, and the method further comprises the first computing service signing a second set of additional data with the proof key, including the second set of additional data in a second message comprising the proof token, and sending the second message through a passive client to the second computing service.

4. The method of claim 2, wherein the set of additional data comprises a profile identity token indicating that an identified profile associated with the passive client is authorized to use the first computing service.

5. The method of claim 1, further comprising:
   authorizing a first profile to use the first computing service; and
   the first computing service receiving a request to use the second computing service, the request to use the second computing service being received from the passive client, the passive client being associated with the first profile, and the first computing service requesting the proof token from the second computing service being done in response to the first computing service receiving the request to use the second computing service.

6. The method of claim 5, wherein the first computing service authorizing the first profile to use the first computing service comprises the first computing service using an identity providing service that is separate from the first computing service to authenticate the first profile.

7. The method of claim 1, wherein the passive client is remote from the first computing service and from the second computing service.

8. The method of claim 1, wherein the passive client is a browser client.

9. The method of claim 1, wherein the method is performed at least in part by hardware logic.

10. A computer system comprising:
at least one processor; and
memory comprising instructions stored thereon that when executed by at least one processor cause at least one processor to perform acts comprising:
requesting a proof token to be sent to a first computing service from a second computing service;
the first computing service receiving a proof key with the requested proof token from the second computing service; and
the first computing service sending a message comprising the proof token through a passive client to the second computing service.

11. The computer system of claim 10, wherein the acts further comprise the first computing service signing a set of additional data with the proof key and including the set of additional data in the message comprising the proof token.

12. The computer system of claim 11, wherein the set of additional data is a first set of additional data, the message comprising the proof token is a first message, and the acts further comprise the first computing service signing a second set of additional data with the proof key, including the second set of additional data in a second message comprising the proof token, and sending the second message through a passive client to the second computing service.

13. The computer system of claim 11, wherein the set of additional data comprises a profile identity token indicating that an identified profile associated with the passive client is authorized to use the first computing service.

14. The computer system of claim 10, wherein the acts further comprise:
authorizing a first profile to use the first computing service; and
the first computing service receiving a request to use the second computing service, the request to use the second computing service being received from the passive client, the passive client being associated with the first profile, and the first computing service requesting the proof token from the second computing service being done in response to the first computing service receiving the request to use the second computing service.

15. The computer system of claim 14, wherein the first computing service authorizing the first profile to use the first computing service comprises the first computing service using an identity providing service that is separate from the first computing service to authenticate the first profile.

16. The computer system of claim 10, wherein the passive client is remote from the first computing service and from the second computing service.

17. The computer system of claim 10, wherein the passive client is a browser client.

18. A computer system comprising:
at least one processor; and
memory comprising instructions stored thereon that when executed by at least one processor cause at least one processor to perform acts comprising:
a first computing service requesting a proof token from a second computing service;
the first computing service receiving the requested proof token and a proof key from the second computing service, the proof token being opaque to the first computing service;
the first computing service signing a set of additional data with the proof key, the set of additional data comprising a profile identity token indicating that an identified profile associated with a passive browser client is authorized to use the first computing service;
the first computing service including the signed set of additional data and the proof token in a message; and
the first computing service sending the message over a computer network and through the passive browser client to the second computing service, the sending of the message through the passive browser client comprising the first computing service identifying the second computing service to the passive browser and instructing the passive browser to send the message to the second computing service.

19. The computer system of claim 18, wherein the set of additional data is a first set of additional data, the message comprising the proof token is a first message, and the acts further comprise the first computing service signing a second set of additional data with the proof key, including the second set of additional data in a second message comprising the proof token, and sending the second message through a passive client to the second computing service.

20. The computer system of claim 18, wherein the acts further comprise:
authorizing a first profile to use the first computing service; and
the first computing service receiving a request to use the second computing service, the request to use the second computing service being received from the passive client, the passive client being associated with the first profile, and the first computing service requesting the proof token from the second computing service being done in response to the first computing service receiving the request to use the second computing service.

* * * * *